INVENTORS
ARTHUR T. STARR
DAVID G. EDWARDS
BY Franklyn C. Weiss
ATTORNEY

Dec. 12, 1972 A. T. STARR ET AL 3,706,054

CHANNEL SHAPING FILTER

Filed Nov. 6, 1970 4 Sheets-Sheet 3

CHANNEL SHAPING FILTER

Filed Nov. 6, 1970 4 Sheets-Sheet 4

United States Patent Office 3,706,054
Patented Dec. 12, 1972

3,706,054
CHANNEL SHAPING FILTER

Arthur T. Starr, New Barnet, and David G. Edwards, Tonbridge Wells, England, assignors to Xerox Corporation, Stamford, Conn.

Filed Nov. 6, 1970, Ser. No. 87,547
Claims priority, application Great Britain, Apr. 21, 1970, 19,040/70
Int. Cl. H04b 3/14
U.S. Cl. 333—28 R 6 Claims

ABSTRACT OF THE DISCLOSURE

A channel shaping filter for location between the modulator and the demodulator of a channel of a data transmission system, the filter being formed by at least one transversal network of the kind comprising at least two time delay network circuits each having an input and an output and connected together in series so as to form a chain having an input, which constitutes the network input, and an output and a number of intermediate junctions each formed where the output of one said circuit is connected to the input of the next succeeding said circuit in the chain, the network also including a separate corresponding pick-off resistance associated with and connected to each of the said chain input, the said chain output and the said intermediate junctions so as to provide in response to an input signal appearing at the network input, a number of pick-off signals equal in number to the number of the resistances, and the network also including means for combining the pick-off signals in predetermined relationship to produce a network output signal, the time delay circuits and the pick-off resistances and the said combining means of the network being selected to provide a preselected relationship between the output and the input signals of the network.

This invention is concerned with improvements in or relating to channel-shaping filters for use in data-transmission systems which are of the type (hereinafter referred to as "the type specified") wherein the system has at least one channel arranged to receive an input signal in the form of a train of pulse-form signals at a predetermined repetition rate and representing the data, that signal being supplied to a modulator to produce a modulator output wherein each said pulse-form signal is represented, according to a prearranged code, as a normal sinusoid or as an inverted sinusoid, in each case of a carrier wave having a frequency equal to the said repetition rate, or as a signal-less interval of duration equal to the period of that carrier wave, the modulator output being conveyed over a transmission link to a demodulator for reconstitution of the said input signal. The invention is particularly, but not exclusively, applicable to the case where the modulator-demodulator system is of the vestigial-sideband type.

According to the invention, there is provided a channel-shaping filter for location between the modulator and the demodulator of a channel of a data-transmission system of the type specified, the filter being formed by at least one transversal network of the kind comprising at least two time-delay network circuits each having an input and an output and connected together in series so as to form a chain having an input, which constitutes the network input, and an output and a number of intermediate junctions each formed where the output of one said circuit is connected to the input of the next succeeding said circuit in the chain, the network also including a separate corresponding pick-off resistance associated with and connected to each of the said chain input, the said chain output and the said intermediate junctions so as to provide, in response to an input signal appearing at the network input, a number of pick-off signals equal in number to the number of the resistances, and the network also including means for combining the pick-off signals in predetermined relationship to produce a network output signal, the time-delay circuits and the pick-off resistances and the said combining means of the network being selected to provide a preselected relationship between the output and the input signals of the network.

Preferably, the or at least one of the networks has an even number of the time-delay circuits arranged in pairs, the circuits of each pair having equal time-delays and being symmetrically located at opposite sides of that one said intermediate junction which is at the centre of the chain, the pick-off resistances being so selected that the pick-off signals comprise a single pick-off signal from the said central one intermediate junction and a number of pairs of pick-off signals for each of which pairs the two signals are similar except in that one is time-delayed relatively to the other.

In one arrangement, the or at least one of the networks has time-delay circuits which have each the same time-delay.

The combining means may comprise, at least in part, the connection of at least two of the pick-off signals to a common point, and/or may comprise, at least in part, an inverting amplifier for reversing the polarity of at least one of the pick-off signals.

The invention also includes a data-transmission system of the type specified, at least one said channel of the system having, connected between the modulator and the demodulator of that channel, a channel-shaping filter according to the invention.

Two examples of the invention will now be described with reference to the accompanying drawings in which:

FIGS. 1(*a*) and 1(*b*) show amplitude-frequency response curves of electrical transmission systems;

FIGS. 2(*a*) and 2(*b*) show the electrical output signals delivered by the systems of FIGS. 1(*a*) and 2(*b*) respectively, in response to an input signal in the form of a pulse of very small width;

Figures 9A, 9B:
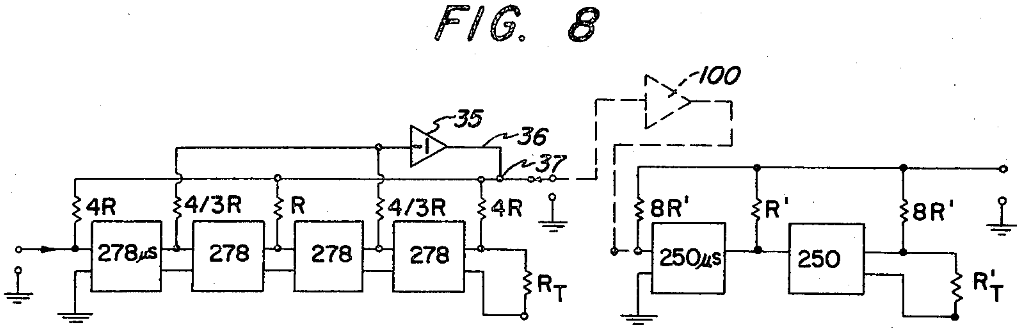
Figure 10:
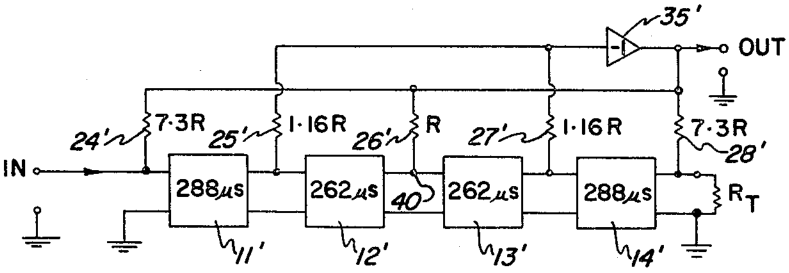

FIGS. 9(A), 9(B) and 10 are part-schematic circuit diagrams of exemplary forms of transversal networks according to the invention.

Figure 1A:
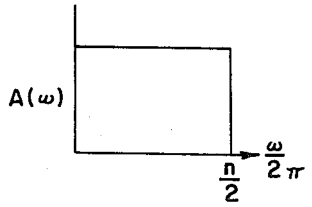
Figure 1B:
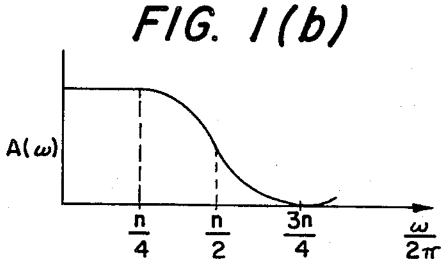
Figures 2A, 2B:
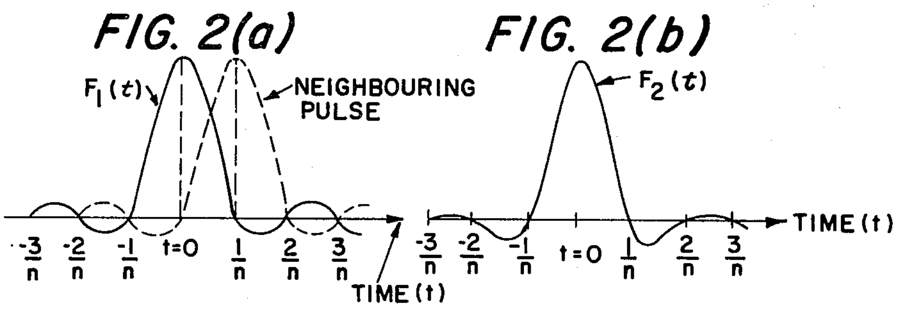

If an electrical transmission system has, as shown in FIG. 1(*a*), an amplitude-frequency response $A(\omega)$ which is level over the frequency bandwidth of ($\omega/2\pi=$) 0 to $n/2$, then the output of that system, in response to a unit-amplitude input signal in the form of a pulse of very small width, is a symmetrical oscillation of the form of the curve $F_1(t)$ of FIG. 2(*a*), where $$F_1(t)=\frac{\sin n\pi t}{n\pi t}$$

The oscillation is of maximum unit amplitude at a time taken to be $t=0$ and is of zero amplitude at times $$t=\pm\frac{1}{n},\ \pm\frac{2}{n}$$

etc.

Thus, if a succession of the pulses is transmitted over the system at a repetition rate of $1/n$, there is zero inter-symbol interference in that neighboring pulses are distinguishable at the output of the system, since (FIG. 2(*a*)) the maximum of each oscillation corresponds to zero amplitude of the next oscillation.

If information is to be transmitted over an electrical transmission system, it is essential that such zero inter-symbol interference exists: it does not exist for all such systems.

The flat response of FIG. 1(*a*) is not achievable in practice: even if it were, the setting-up of such a system would be very critical because of the slow decay of the oscillation of FIG. 2(*a*).

The electrical transmission system may, instead, be selected to have an amplitude-frequency response of the form of FIG. 1(*b*) wherein the response is unity over the frequency bandwidth 0 to $n/4$, and then follows a cosine curve so that $A(\omega)$ equals ½ and 0 respectively at the frequencies $n/2$ and $3n/4$. In such case, the output of the system, in response to the said unit-amplitude input signal, is the oscillation $F_2(t)$ of FIG. 2(*b*), where $$F_2(t)=\frac{\sin n\pi t}{n\pi t}\cdot\frac{\cos \frac{1}{2}n\pi t}{(1-nt)^2}$$

Here, there is again zero inter-symbol interference, because of the $$\frac{\sin n\pi t}{n\pi t}$$

one of the two factors.

Figure 3:
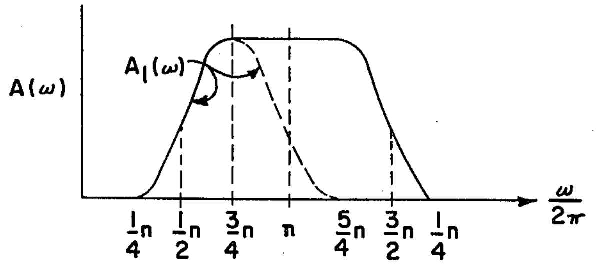
FIG. 3 shows amplitude-frequency response curves applicable to the case where information is transmitted by means of an amplitude-modulated carrier wave.

In the case where the electrical transmission system includes amplitude modulation of a carrier wave, if the received baseband spectrum is of the form of FIG. 1(*b*), then the spectrum at the output of the modulator with carrier frequency ($n$) is as shown by the full line of FIG. 3. If the vestigial lower sideband is chosen with a cosine roll-off about the carrier frequency, as shown by the broken line in FIG. 3, then the spectrum is a full, raised cosine curve extending as shown between the frequencies $n/4$ and $5n/4$. This response curve will be denoted by $A_1(\omega)$.

Thus, the spectrum of an output wave due to a single unit input pulse should possess the distribution $A_1(\omega)$ in the modulated condition. When that pulse is very short, the system response should have the form $A_1(\omega)$ because an impulse has a uniform frequency-spectrum. But if that pulse is not very short, then its spectrum must be allowed for.

Figure 4:
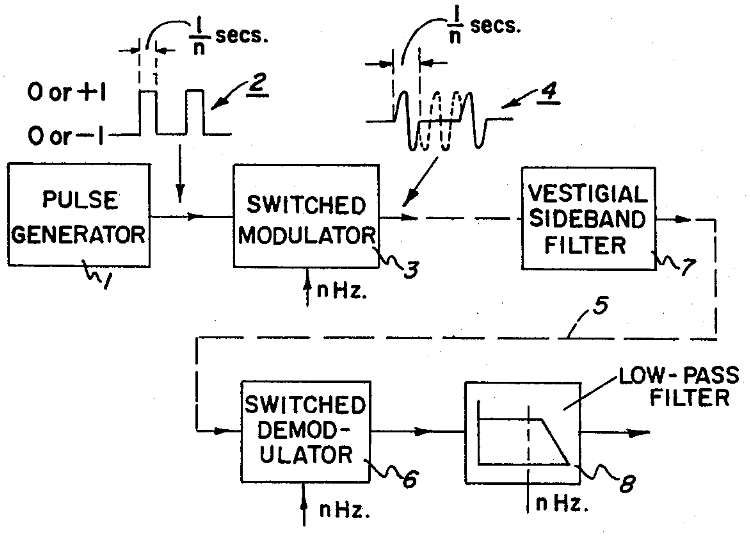
FIG. 4 is a block diagram illustrating a type of data-transmission systems to which the invention is applicable.

FIG. 4 illustrates the form of one channel of a data-transmission system to which the invention is applicable, the system employing amplitude modulation (1, 0) or (1, −1), carrier modulation, and vestigial single-sideband transmission. A source in the form of a pulse generator 1 provides (as indicated at 2) an input signal in the form of a train of pulses which may be either of the kind (1, 0), or of the kind (1, −1) and which are each of duration $1/n$ second. The pulses are fed to the input of a switched modulator 3 wherein they are arranged to so modulate a carrier wave of frequency ($n$) Hz., which is synchronized with the source of the pulses, as to produce complete, but possibly separated, cycles of the carrier wave at the output of the modulator 3, according to a prearranged code.

Thus, for example, the arrangement may be such that where (as indicated at 2) the input signal has, during four consecutive periods, the magnitudes 1, (0 or −1), (0 or −1), and 1 respectively, the modulator output is zero during the second and third of the periods but constitutes, during each of the first and fourth periods, a complete normal sinusoid of the carrier wave (as indicated by the full lines at 4). In a variant of this arrangement (as in our co-pending patent application Ser. No. 87,545, filed on Nov. 6, 1970), the arrangement is the same except in that the modulator 3 is so arranged that each alternate one of the sinusoids is inverted. In an alternative variant of the first-mentioned arrangement, the modulator output during each of the said second and third of the periods is not zero but comprises a complete inverted sinusoid of the carrier wave (as indicated by the broken lines at 4). Other, similar arrangements are also within the scope of the invention.

In the more general case, the pulse generator 1 may supply pulse-form signals at the repetition rate ($n$), which signals may be of any shape, provided that the modulator 3 always yields full single sinusoids, as described above.

The modulator output is then conveyed over a transmission link (indicated at 5) to a switched demodulator 6, a shaping vestigial-sideband filter 7 being interposed between the output of the modulator 3 and the input of the demodulator 6. The output signal from the demodulator 6 is passed through a low-pass filter 8 of which the function is to pass, without attenuation or phase distortion, waves of a frequency up to and a little beyond the frequency ($n$) Hz.

The filter 7 is conveniently located either at the modulator output or at the demodulator input; alternatively, it may in certain cases be formed in two portions which are located remote from one another.

Had the system input been in the form of very narrow pulses, then the required characteristic of the filter 7 would have been $A_1(\omega)$ of FIG. 3. The required characteristic for the actual arrangement will now be derived.

The spectrum of a single-cycle sinusoid is given by $$A_2(\omega)=\int_{-}^{+} F \sin \omega t dt$$

$$=2\int_0^{1/2n} \sin (2\pi nt) \sin \omega t dt$$

$$=\frac{4\pi n \sin (\omega/2n)}{4\pi^2 n^2-\omega^2}$$

where F is the sine wave, $\sin (2\pi nt)$ for one cycle only, i.e. between $$t=-\frac{1}{2n}$$

and $$t=+\frac{1}{2n}$$

It is convenient to choose a normalising factor such that $A_2(\omega)=1$ at the frequency $\omega/2\pi=n$. Then $$A_2(\omega)=\frac{\left(\frac{2}{\pi}\right)\sin\left(\frac{\omega}{2n}\right)}{1-\left(\frac{\omega}{2\pi n}\right)^2}$$

Since, at the receiving end of the system, we require the spectral distribution $A_1(\omega)$, the filter 7 should therefore have the characteristic $A_1(\omega)/A_2(\omega)$.

Figure 5:
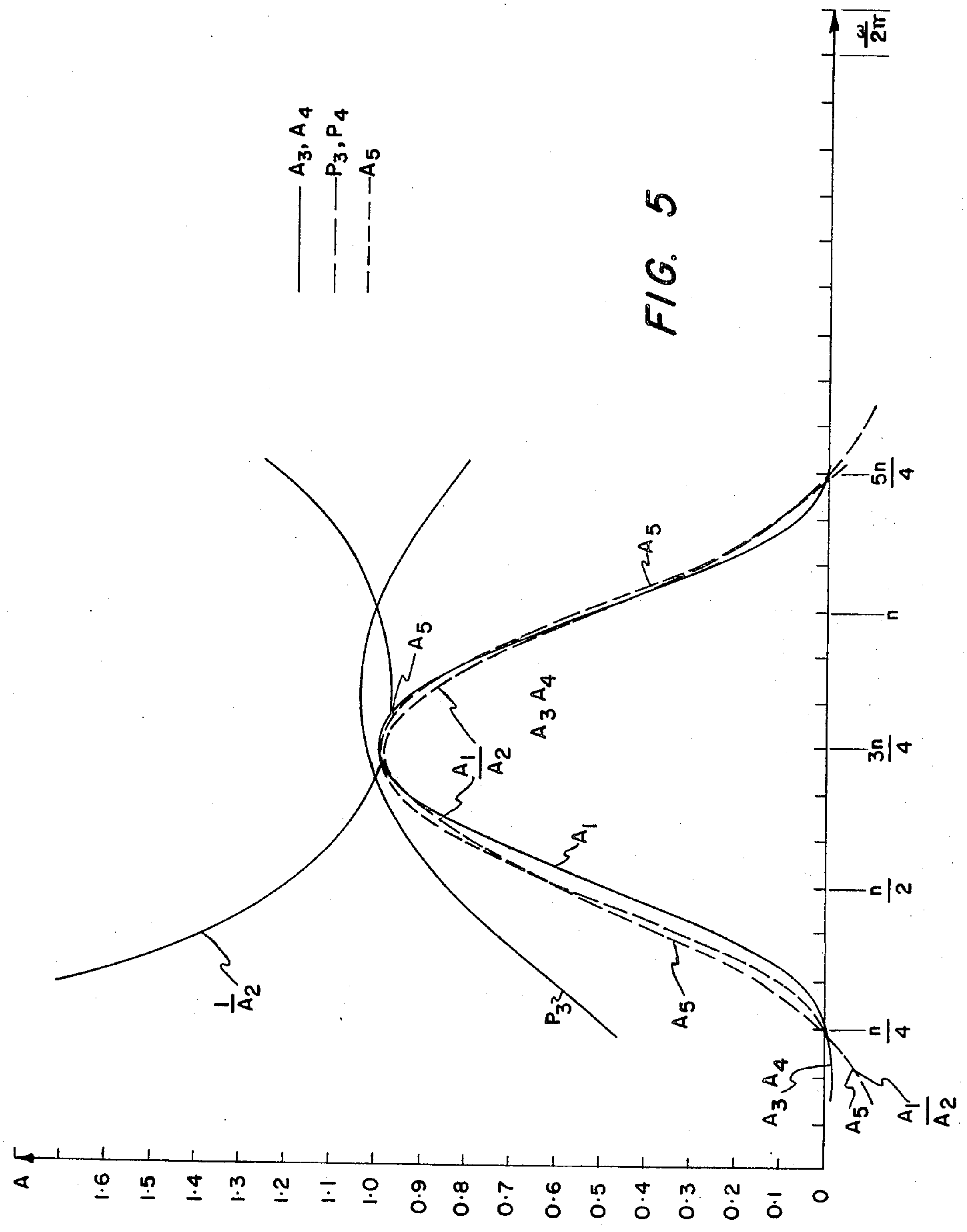
FIG. 5 shows certain amplitude-frequency response curves applicable to the invention.

FIG. 5 includes plots of the functions $A_1(\omega)$, $A_2(\omega)$, $1/A_2(\omega)$ and $A_1(\omega)/A_2(\omega)$ against frequency $(\omega/2\pi)$, for the particular case where $n=2400$ Hz.

It is in general difficult to design and construct a filter 7 with the required characteristic, but we have found simplified ways of doing this in the present case.

In the first of the two methods to be described, it is shown how to derive two networks respectively with responses of the forms $A_1(\omega)$ and $1/A_2(\omega)$: these two networks will, when placed in tandem (e.g. as indicated by broken lines in FIG. 9, where 100 is a buffer amplifier stage), yield the required response factor $A_1(\omega)/A_2(\omega)$. In the second of the two methods to be described, the network yields directly the required response factor.

FIRST METHOD

Figure 6:
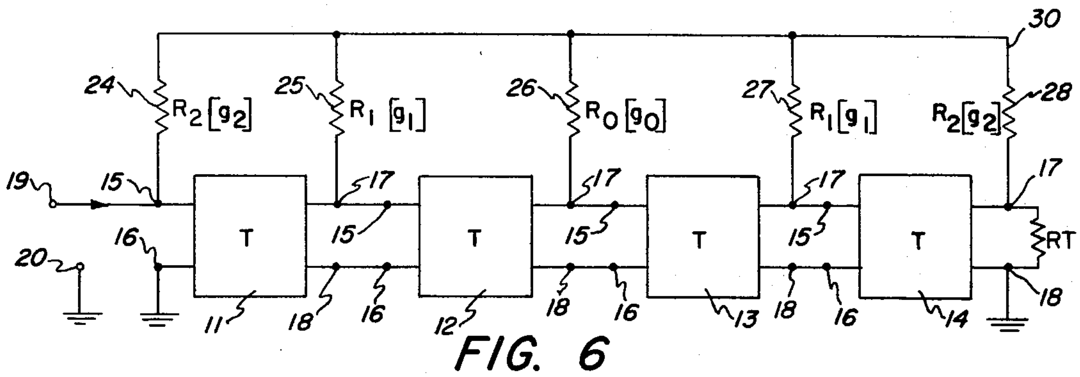
FIG. 6 is a part-schematic circuit diagram of one form of transversal network which may be employed according to the invention.

Each of the methods makes use of at least one transversal network of a particular kind (of which one example is shown in FIG. 6). In the case of FIG. 6, the transversal network comprises four identical delay networks 11, 12, 13, and 14 each having input terminals 15, 16 and output terminals 17, 18, the networks 11–14 being connected together in series, output to input, to form a chain.

Each of the networks 11–14 of FIG. 6 has the same time-delay T, so that if a wave represented by $e^{j\omega t}$ is supplied to the input of one of those networks, there emerges at the output of that network a corresponding wave represented by $e^{j\omega(t-\tau)}$, i.e. each of the networks has a response factor $e^{-j\omega T}$.

Figure 7:
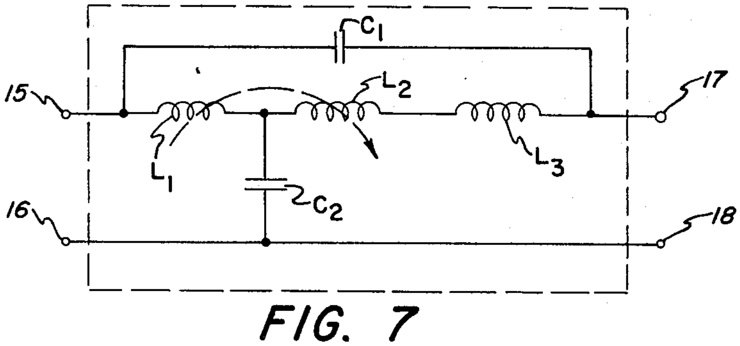
FIG. 7 is a circuit diagram of a time-delay network for use in the network of FIG. 6.

FIG. 7 shows one suitable form of delay network. The terminal 15 is connected to the terminal 17 by way of three series-connected inductances $L_1$, $L_2$ and $L_3$, the inductances $L_1$ and $L_2$ being intercoupled and the three inductances being bridged by a capacitance $C_1$. The terminals 16 and 18 are directly interconnected by a line which is connected, by way of a capacitance $C_2$, to the common point of the inductances $L_1$ and $L_2$.

In FIG. 6, the input terminal 16 of the network 11, and the output terminal 18 of the network 14, are connected to earth. The chain of networks may thus be regarded as having an input (afforded by the terminal 15 of the network 11, which terminal is connected to the input terminal 19 of the complete transversal network), an output (afforded by the terminal 17 of the network 14), and three intermediate junctions each formed where the output of one of the networks 11–13 is connected to the input of the next succeeding network in the chain, the three intermediate junctions being in this case afforded by the terminals 17 of the respective networks 11–13.

The transversal network also includes a separate corresponding pick-off resistance associated with and connected to each of the said chain input, the said chain output and the said intermediate junctions so as to provide, in response to an input signal appearing at the network input (terminal 19), a number of pick-off signals equal in number to the number of the resistances. In the case of FIG. 6, these resistances are constituted respectively by the resistances 24, 28, and 25, 26, 27, the remote ends of the resistances being shown as commoned by connection to the output terminal 30 of the transversal network. In the idealized case of FIG. 6, the resistance 26 is of magnitude $R_0$, the resistances 25 and 27 are of identical magnitude $R_1$, and the resistances 24 and 28 are of identical magnitude $R_2$, the resistances $R_0$, $R_1$ and $R_2$ corresponding respectively to conductances $g_0$, $g_1$ and $g_2$.

A suitable terminal impedance, in the form of a resistance $R_T$, is connected in known manner between the terminals 17 and 18 of the network 14.

Thus, in FIG. 6, the output current wave (at the terminal 30, when 30 is connected to a very low impedance) for unit input wave (at the terminal 19) is the sum of the five pick-off signals obtained respectively via the five resistances 24–28, and is given by $$g_2+g_1e^{-j\omega T}+g_0e^{-j\omega 2T}+g_1e^{-j\omega 3T}+g_2e^{-j\omega 4T}$$
$$=e^{-j\omega 2T}\{g_2e^{j\omega 2T}+g_1e^{j\omega T}+g_0+g_1e^{-j\omega T}+g_2e^{-j\omega 2t}\}$$
$$=e^{-j\omega 2T}(g_0+2g_1\cos\omega T+2g_2\cos 2\omega T)$$

it being noted that this result is obtained by combining four of the five pick-off signals in pairs (e.g. $g_1e^{-j\omega t}$ and $g_1e^{-j\omega 3T}$) of which the two signals are of equal amplitude ($g_1$) but differ in that one is delayed relatively to the other.

The factor $e^{-j\omega 2T}$ may be ignored, since it represents only a distortionless delay of 2T. Then the transversal network of FIG. 6 has the response $$A_3(\omega)=g_0+2g_1\cos\omega T+2g_2\cos 2\omega T$$

Figure 8:
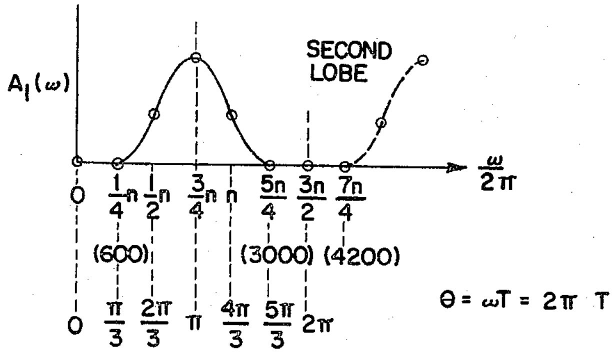
FIG. 8 is an amplitude-frequency response curve illustrating the invention.

We require to choose T, $g_0$, $g_1$ and $g_2$ such that $A_3(\omega)$ has the required form of $A_1(\omega)$. Noting that $A_3$ is symmetrical about $\theta=\omega T=\pi$, we choose T such that $\theta=\pi$ at the frequency $$\frac{\omega}{2\pi}=\frac{3n}{4}$$

at which (FIGS. 3, 8) $A_1(\omega)$ has its maximum value of unity. This gives $$T=\frac{2}{3n}$$

We then choose $g_0$, $g_1$ and $g_2$ such that $A_3$ is equal to $A_1$ at $\theta=0$, $\pi/3$ and $2\pi/3$ noting that $A_3$ will then have the correct values at $$\theta=\frac{4\pi}{3},\ \frac{5\pi}{3}\text{ and }2\pi$$

We thus put $$A_3=0\text{ at }\theta=0,\ A_3=0\text{ at }\theta=\frac{\pi}{3}\text{ and }A_3=\tfrac{1}{2}\text{ at }\theta=\frac{2}{3}$$

The resulting equations give $$g_0=\tfrac{1}{3},\ g_1=-\tfrac{1}{4},\text{ and }g_2=\tfrac{1}{12}$$

whence $$A_3(\omega)=\tfrac{1}{3}[1-\tfrac{3}{2}\cos\omega T+\tfrac{1}{2}\cos 2\omega T]$$

The following table shows how close $A_3(\omega)$ is to $A_1(\omega)$:

| ωT | 0 | 30° | 60° | 90° | 120° | 150° | 180° |
|---|---|---|---|---|---|---|---|
| $A_1(\omega)$ | 0 | 0 | 0 | .147 | .500 | .853 | 1.00 |
| $A_3(\omega)$ | 0 | −.02 | 0 | .166 | .500 | .850 | 1.00 |

The ratio of the resistances $R_0=R_1=R_2$ is given by the ratio $$\frac{1}{g_0}:\frac{1}{g_1}:\frac{1}{g_2}$$
$$=3:(-4):12$$
$$=1:\left(-\frac{4}{3}\right):4$$

the negative sign indicating that those pick-off signals which are obtained via the resistances 25 and 27 (of resistance $R_1$) need to be inverted relatively to the remaining pick-off signals.

In the case where ($n$), as referred to in connection with FIG. 4, is equal to 2400 bits/second (as in FIG. 5), $T=2/7200=278$ microseconds, and the required network of response $A_3(\omega)\simeq A_1(\omega)$ may have the basic form shown in FIG. 9(A) wherein R represents the magnitude of a basic resistance and 35 represents an amplifier of current gain equal to (−1), of very low input impedance, and of high output impedance.

In practice, in certain cases the magnitudes and/or arrangement of the pick-off resistances of FIG. 9(A) may have to be modified somewhat, in generally known manner and by simple experiment, in order to obtain the required result. An example of such a modification is given in our co-pending patent application Ser. No. 87,546, filed on Nov. 6, 1970. Such modification is necessitated because, whereas the above theory assumes that, for each day of the delay networks 11–14, the associated pick-off resistances can be so chosen as not to significantly affect the values of the load and source impedances presented to those networks, in practice however, convenient values of those resistances do not always meet this condition. In selecting such modified pick-off resistances, the basic principle mentioned above may be borne in mind, that the required result can be obtained by combining four of the five pick-off signals in pairs of which the two signals are of equal amplitude but differ in that one is delayed relatively to the other.

We also require a further network with response factor $1/a_2(\omega)$ (shown in FIG. 5). This curve is roughly a cosine curve on a pedestal, with a minimum at a frequency of about 2000 Hz. We obtain the desired response by means of a transversal network of the general kind described above but having only two of the identical delay networks and thus having a response of the form $$A_4(\omega)=g_0+2g_1\cos\omega T$$

We choose T in this case, such that $\theta=\omega T=\pi$ at the frequency $$\frac{\omega}{2\pi}=2000\text{ Hz.}$$

which gives $T=250$ microseconds. We then choose $g_0$ and $g_1$ such that (as in FIG. 5) $1/A_2=1.18$ at the frequency 1200 Hz. and $1/A_2=0.96$ at the frequency 2000 Hz., whence $$g_0=1.28\text{ and }g_1=0.16$$

and $$A_4(\omega)=1.28(1+0.25\cos\omega T)$$

In this case, the ratio of the resistances $R_0:R_1$ is given by the ratio $$\frac{1}{g_0}:\frac{1}{g_1}=1:8$$

and the required network may have the basic form shown in FIG. 9(B) wherein R′ represents the magnitude of a basic resistance, and $R_T'$ is the terminal resistance.

It is again to be understood that the circuit of FIG. 9(B) is of basic form and may in practice be modified in the general manner described above for the case of FIG. 9(A). Similar comments apply in the present case.

The complete filter is obtained by connecting the two networks of FIGS. 9(A) and 9(B) in tandem, for example as indicated by the broken lines in FIG. 9, where 100 represents an amplifier, with a very low input impedance, which amplifies the current wave from point 37 and presents it as a voltage wave with the correct source impedance to the input of the network of FIG. 9(B). It will be clear that, of the two parts of the filter, FIGS. 9(A) and 9(B) respectively, one may be located at the output of the modulator 3 and the other at the input of the demodulator 6.

SECOND METHOD

We make small differences to the amplitudes and angles of the transversal network, of the form of FIG. 6, which has the response.

$$A_3(\omega)=\tfrac{1}{3}[1-\tfrac{3}{2}\cos\omega T+\tfrac{1}{2}\cos 2\omega T]$$

which is nearly equal to $A_1(\omega)$.

These differences consist in perturbing slightly the conductances $g_0$, $g_1$ and $g_2$ and the delay time T, such that the resulting network has a response of the form $$A_5=\tfrac{1}{3}[1-(\tfrac{3}{2}+a)\cos(1+b)e+(\tfrac{1}{2}+c)\cos 2(1+d)e]$$

where $e$ has been written for $\omega$T, and where $a$, $b$, $c$ and $d$ are to be small.

Noting that, with these assumptions, $$\cos(1+b)e\doteq\cos e-be\sin e$$

and $$\cos 2(1+d)e\doteq\cos 2\theta-2de\sin 2\theta$$

we find, on ignoring products in $(ab)$ and $(cd)$, that $$A_5=A_3+\tfrac{1}{3}(-a\cos e+\tfrac{3}{2}b\theta\sin\theta+c\cos 2\theta-d\theta\sin 2\theta)$$

In order to fit $A_5$ to the curve $(A_1/A_2)$ of FIG. 5, we choose, $A_5=0$ at $\theta=60°$ and at $\theta=300°$ (i.e. FIG. 5, at the frequencies 600 Hz. and 3000 Hz. respectively). This gives $$c=-a,\text{ and }d=\tfrac{3}{2}b$$

We now choose to arrange that the responses afforded by $A_5$ at $\theta=120°$ and $\theta=240°$ (i.e. FIG. 5, at the frequencies 1200 Hz. and 2400 Hz. respectively) shall be the correct fractions of the required response of $A_5$ and $\theta=180°$ (i.e. FIG. 5, at the frequency 1800 Hz.). Referring to FIG. 5, we therefore require that $$\frac{A_5(120°)}{A_5(180°)}=\frac{0.59}{0.974}=0.606$$

and $$\frac{A_5(240°)}{A_5(180°)}=\frac{0.5}{0.974}=0.514$$

This gives $$a=0.226,\ b=0.017,\ c=-0.226,\text{ and }d=0.0254$$

so that the required response is of the form $$A_5\tfrac{1}{3}(1-1.726\cos 1.017\theta+0.274\cos 2.051\theta)$$

Since $\theta=\omega T=\pi$ at the frequency 1800 Hz. (corresponding to $n=2400$), $T=278$ microseconds and thus cos $1.017\theta$ and cos $2.051\theta$ respectively require delays of $1.017\times278=282$ microseconds and of 288 microseconds.

The required network of response $A_5\simeq A_1/A_2$ is thus of the form shown in FIG. 10. It will be noted that the chain of delay networks comprises two pairs, 11′ and 14′, and 12′ and 13′, the networks of each pair having equal time-delays and being symmetrically located at opposite sides of that one side intermediate junction 40 which is at the centre of the chain. If the resistance 26′, the equal resistances 25′ and 27′, and the equal resistances 24′ and 28′, have resistances which are respectively $R_0'$, $R_1'$ and $R_2'$, then $R_0':R_1':R_2'=1:1.16:7.3$, R representing in FIG. 10 the magnitude of a basic resistance and 35′ representing an amplifier similar to the amplifier 35.

The network of FIG. 10 will provide anti-phase components of about 0.10 in the frequency bands between 0 and 300 Hz. and between 3300 and 3600 Hz., but it is probable that the transmission link 5 (FIG. 4) will suppress these components.

It is to be understood that the circuit of FIG. 10 is of basic form, and similar remarks apply here as above in the case of the circuit of FIG. 9(A).

We claim:

1. A transversal filter for location between the modulator and the demodulator of a channel of a data transmission system, comprising;

an even number of time delay circuits connected in series to form a chain having an input and an output, separate pick-off resistive means connected to corresponding ones of the chain input and output, and the intermediate junctions between said time-day circuits to provide, in response to an input signal appearing at the network input, a number of pick-off signals equal in number to the number of the resistive means, first means for combining and inverting the polarity of the pick-off signals from those of the pick-off resistive means connected to the junctions at the outputs of the delay circuits located at the odd positions in chain, and second means for directly combining the pick-off signals from the remainder of pick-off resistive means and the output of said first combining and inverting means for providing an output signal of said transversal filter, wherein each of the respective pairs of said delay circuits located at symmetrically opposite sides of the center junction of the chain has an equal time delay and provides predetermined amounts of different time delays relative to other pairs of the delay circuits as a function of the base carrier frequency of the transmission system and the pick-off resistive means located symmetrically at the opposite sides of the center pick-off resistive means have a same resistance whereby said transversal filter provides a preselected relationship between the input and output thereof.

2. The filter according to claim 1 wherein said chain includes four time delay circuits and five pick-off resistive means comprised of a resistor $R_0$ connected to the center junction, an inner pair of resistors $R_1$ located symmetrically on opposite sides of said center pick-off resistor $R_0$, and outer pair $R_2$ located outside of said inner pair of resistors, wherein the value of said resistances are related in terms of their magnitude $R_0:R_1:R_2=1:1.16:7.3$.

3. The filter according to claim 2, wherein the values of the circuit elements of said time delay circuits, pick-off resistors, and combining means are so selected that said filter functions as a vestigial side band filter in said data transmission system.

4. A transversal filter for location between the modulator and the demodulator of a channel of a data transmission system, comprising;

first chain of an even number of time delay circuits connected in series having an input and an output, separate pick-off resistive means connected to corresponding ones of said first chain input and output, and the intermediate junctions between said time-delay circuits to provide, in response to an input signal appearing at the network input, a number of pick-off signals equal in number to the number of the resistive means, first means for combining and inverting the polarity of the pick-off signals from those of the pick-off resistive means connected to the junctions at the outputs of the delay circuits located at the odd positions in the chain, and second means for directly combining the pick-off signals from the remainder of pick-off resistive means and the output of said first combining means for providing an output signal of said first chain, a second chain of even number of time delay circuits connected in series wherein the input thereof is connectable to the output of said first chain and the output is connectable to the demodulator of the transmission system wherein the time delays introduced by the delay circuits of said second chain are different from the time delays introduced by the delay circuits of said first chain.

5. The filter according to claim 4 wherein said first chain includes four time delay networks and five pick-off resistive means wherein two outer pairs of resistive means connected to the input and output and intermediate junctions have resistances which are four times (4R) and four third ($4/3R$) times the resistance R of the resistive means connected to the center junction, and wherein said second chain includes a pair of time delay networks and a pair of resistive means located symmetrically on opposite sides of the center junction of the second chain having eight times the resistance value of the pick-off resistive means connected to said center junction of the second chain.

6. The filter according to claim 5 wherein the values of the circuit elements of said time delay circuits, pick-off resistors, and combining means are so selected that said filter functions as a vestigial side band filter in said data transmission system.

References Cited

UNITED STATES PATENTS

| | | | |
|---|---|---|---|
| 3,292,110 | 12/1966 | Becker | 333—18 |
| 3,070,749 | 12/1962 | Burns et al. | 328—177 |
| 3,001,137 | 9/1961 | Kassel et al. | 328—38 |
| 3,537,038 | 10/1970 | Rich | 333—70 T |
| 3,017,578 | 1/1962 | Lundry | 330—87 |

PAUL L. GENSLER, Primary Examiner

U.S. Cl. X.R.

325—42, 50; 328—162; 333—29, 70 T